US008801044B2

(12) United States Patent
Stemmle et al.

(10) Patent No.: US 8,801,044 B2
(45) Date of Patent: Aug. 12, 2014

(54) METHOD FOR CREATING A SINGLE CONTINUOUS WEB FROM WHICH TO FABRICATE MAILPIECES

(75) Inventors: Denis J. Stemmle, Stratford, CT (US); Clare E. Woodman, Norwalk, CT (US); John W. Sussmeier, Cold Spring, NY (US); Michael J. Cummings, Berlin, CT (US)

(73) Assignee: Pitney Bowes Inc., Stamford, CT (US)

( * ) Notice: Subject to any disclaimer, the term of this patent is extended or adjusted under 35 U.S.C. 154(b) by 747 days.

(21) Appl. No.: 12/721,586

(22) Filed: Mar. 11, 2010

(65) Prior Publication Data

US 2010/0167895 A1 Jul. 1, 2010

Related U.S. Application Data

(63) Continuation of application No. 12/041,689, filed on Mar. 4, 2008, now Pat. No. 7,699,352, which is a continuation of application No. 11/061,252, filed on Feb. 18, 2005, now Pat. No. 7,357,080.

(51) Int. Cl.

| | |
|---|---|
| ***B42D 1/00*** | (2006.01) |
| ***B42D 19/00*** | (2006.01) |
| ***B42D 3/18*** | (2006.01) |
| ***B42D 15/00*** | (2006.01) |
| ***B42D 11/00*** | (2006.01) |
| ***B42D 12/00*** | (2006.01) |
| ***B42D 12/02*** | (2006.01) |
| ***B42D 15/10*** | (2006.01) |
| ***G09C 3/00*** | (2006.01) |

(52) U.S. Cl.
USPC ........ 283/116; 281/2; 281/5; 281/51; 283/61; 283/62; 283/67; 283/70; 283/72; 283/74; 283/79; 283/94; 283/98; 283/117; 283/901

(58) Field of Classification Search
USPC .......... 281/51, 2, 5; 283/116, 117, 61, 62, 67, 283/70, 72, 74, 79, 94, 98, 901
See application file for complete search history.

(56) References Cited

U.S. PATENT DOCUMENTS 3,557,519 A 1/1971 Lyon
3,845,698 A 11/1974 Scholle (Continued)

*Primary Examiner* — Edward Tolan
*Assistant Examiner* — Justin V Lewis
(74) *Attorney, Agent, or Firm* — Michael J. Cummings; Charles R. Malandra, Jr.; Steven J. Shapiro

(57) ABSTRACT

A method for producing a continuous web of printed material for use in creating mailpieces. The continuous web has a width and a length, the length comprised of a series of attached sheets. The series of attached sheets are comprising envelope sheets and rectangular content pages. The content pages are rectangular in shape and may be oriented relative to the envelope sheets in a number of different configurations. In some configurations, two sets of content pages and/or envelope sheets can be printed across the width of the web. Sheets for forming business return envelopes may be printed in series with the content pages and envelope sheets. BREs may include individualized return addresses. A control code may be printed on one or more of the sheets for a given mailpiece, providing information for controlling assembly of the mailpiece. Two sets of sheets may be printed across the width of the web by printing content pages onto the continuous web such that two end-to-end content pages are printed across the width of the web. Positioning of mail content pages and envelope sheets for a given mailpiece may be optimized based on respective processing times determined for the system.

12 Claims, 12 Drawing Sheets

(56) References Cited

U.S. PATENT DOCUMENTS

| | | | | |
|---|---|---|---|---|
| 3,902,655 | A | | 9/1975 | Huffman |
| 3,998,138 | A | | 12/1976 | Walters |
| 4,067,171 | A | | 1/1978 | Herbert et al. |
| 4,161,091 | A | | 7/1979 | Hartnig |
| 4,437,852 | A | | 3/1984 | Volk, Jr. et al. |
| 4,543,082 | A | | 9/1985 | Stenner |
| 4,651,920 | A | | 3/1987 | Stenner |
| 4,912,909 | A | | 4/1990 | Stenner |
| 5,169,060 | A | | 12/1992 | Tighe et al. |
| 5,340,017 | A | | 8/1994 | Tighe |
| 5,421,620 | A | * | 6/1995 | Sauerwine .................... 283/116 |
| 5,997,457 | A | | 12/1999 | Stenner |
| 2004/0016210 | A1 | | 1/2004 | Mertens |
| 2004/0114161 | A1 | | 6/2004 | Stemmle |

* cited by examiner

METHOD FOR CREATING A SINGLE CONTINUOUS WEB FROM WHICH TO FABRICATE MAILPIECES

RELATED APPLICATION

The present application is related to U.S. Pat. No. 7,357,080, issued Apr. 15, 2008, and U.S. application Ser. No. 12/041,689, filed Mar. 4, 2008, now issued as U.S. Patent on Mar. 4, 2010, and assigned to the assignee of the present invention.

FIELD OF THE INVENTION

The present invention relates generally to a mail creation system that uses an input of a single web of paper to create content and envelopes for creation and mass-production of a finished mailpieces.

BACKGROUND OF THE INVENTION

Inserter systems are typically used by organizations such as banks, insurance companies and utility companies for producing a large volume of specific mailings where the contents of each mail item are individualized to a particular addressee. Also, other organizations, such as direct mailers, use inserters for producing a large volume of generic mailings where the contents of each mail item are substantially identical for each addressee. Examples of such inserter systems are the 8 series, 9 series, and APS™ inserter systems available from Pitney Bowes Inc. of Stamford, Conn.

In many respects, the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mail piece is produced. The exact configuration of each inserter system depends upon the needs of each particular customer or installation.

Currently materials are received from multiple sources for creation of mailpieces. A first source is a continuous web of printed material that comprises the individualized content, such as a statement, or bill. A second source of material may be inserts, such as advertisements or special offers, that are fed from separate feeders to be joined with the statement papers. A third source is business reply envelopes (BRE's) to be included with the statement. A fourth source is the stack of envelopes that comprise the outer package into which the collated individualized statement, inserts, and BRE are to be inserted. Each of these sources is introduced to the inserter machine at a different location.

A workflow for creating mail pieces requires that the proper physical material sources be obtained and input into the conventional inserter machine. A delay might occur if proper inserts or envelopes were not available to be used for a given mail run. Also, operator labor is required in order to maintain the appropriate stacks of envelopes and inserts that are to be included with the mail run. Labor and expense are also required for ordering, warehousing, and moving materials to the inserter system.

At an input end of the inserter system, the continuous web must be separated into individual document pages. This separation is typically carried out by a web cutter that cuts the continuous web into individual document pages. In a typical web cutter, a continuous web of material with sprocket holes on both side of the web is fed from a fanfold stack from web feeder into the web cutter. The web cutter has a tractor with pins or a pair of moving belts with sprockets to move the web toward a guillotine cutting module for cutting the web crosswise into separate sheets. Perforations are provided on each side of the web so that the sprocket hole sections of the web can be removed from the sheets prior to moving the cut sheets to other components of the mailing inserting system. Downstream of the web cutter, a right angle turn may be used to reorient the documents, and/or to meet the inserter user's floor space requirements.

The separated documents must subsequently be grouped into collations corresponding to the multi-page documents to be included in individual mail pieces. This gathering of related document pages occurs in the accumulator module where individual pages are stacked on top of one another. The control system for the inserter senses markings on the individual pages to determine what pages are to be collated together in the accumulator module.

Downstream of the accumulator, a folder typically folds the accumulation of documents, so that they will fit in the desired envelopes. To allow the same inserter system to be used with different sized mailings, the folder can typically be adjusted to make different sized folds on different sized paper. As a result, an inserter system must be capable of handling different lengths of accumulated and folded documents. Downstream of the folder, a buffer transport transports and stores accumulated and folded documents in series in preparation for transferring the documents to the synchronous inserter chassis.

Insert feeders then add the additional insert documents, such as advertisements or special offers, to the collations. Business return envelopes (BRE's), if applicable may also be fed from a separate envelope feeder to become part of the collation. The completed collations are then transported on the conveyor to an insertion station where they are automatically stuffed into envelopes provided from yet another envelope feeder. After being stuffed with the collations, the envelopes are removed from the insertion station for further processing. Such further processing may include automated closing and sealing the envelope flap, weighing the envelope, applying postage to the envelope, and finally sorting and stacking the envelopes.

SUMMARY OF THE INVENTION

The current generation of high speed mail creation equipment has a number of limitations. First, the current generation of high speed mail creation equipment is quite expensive and complicated. The dedicated processing for each of the elements of the mail pieces is one of the reasons why the mail creation equipment is so expensive and complicated. The equipment design could be made significantly less expensive and simpler if some of the dedicated steps for handling the variety of mail piece components could be either eliminated, or made common.

Secondly, it is known that the step of inserting the contents of the mail piece into the envelope is a trouble prone step in the mail creation process. The performance of the equipment could be improved substantially if this step could be eliminated.

Thirdly, in the current equipment, each of the mail piece components must be sourced or created separately, and brought to the mail creation equipment for loading just prior to running the job. Often, this materials management operation involves multiple steps, including ordering, printing, shipping, transporting, warehousing, and materials movement to and from the mail creation equipment. Each of these steps involves labor and expenses that are properly part of the cost of creating the mail pieces. The cost of creating mail pieces could be reduced substantially if a single item containing all of the components of the mail piece could be ordered, printed, shipped, transported, warehoused, etc.

Fourth, when mail pieces are created from discrete elements, each of these elements must be fed, registered, transported, etc. Each of these steps introduces additional potential for malfunctions. A machine to create mail without at least some of the traditional steps will be more reliable. It would be beneficial if more elements of the mail piece could be cut from a continuous web, for example a roll, of paper in order to eliminate the unreliability of feeding and registering these components.

Finally, for some types of jobs such as bank statements, account information, insurance communications, etc each mail piece tends to be unique. The number of sheets of information to be included in each mail piece is a variable. Because of the limitations of the current generation of mail creation equipment, typically only one type of mail piece can be created within any one job. So, for example, the envelope to be used in the mail pieces is a No 10 envelope, which is capable of accepting up to about five sheets of paper tri-folded prior to insertion. If more than five sheets are to be sent to persons on the mailing list, typically this situation is handled as an exception. For example, if one of the mail recievers is to receive nine pages of information, this much paper cannot be successfully trifolded and inserted into a No 10 envelope. So, if the individual sheets of the mail pieces are being cut from a roll containing all the sheets for all the recipients, the nine pages for the mail receiver in this example would be cut from the roll and set aside for processing later—either manually, or with another set of equipment, or after setting up the mail creation equipment to handle half folded contents inserted into 6"×9" envelopes. In some cases, the number of sheets to be sent to one of the mail receivers on the list may exceed the number that can be inserted into a 6×9" envelope. For example, if fifty pages are to be sent so one of the mail recievers within the job, then these must also be cut from the roll, compiled, and set aside for manual or automated processing into a flats envelope without folding the sheets. (Flats envelopes are larger sized envelopes for holding unfolded sheets.) It would be beneficial if a system or method existed that could create No 10, and 6×9, and flats envelopes within the same jobs, and without exception handling.

This proposed method and system addresses these limitations of the current mail creation equipment. It simplifies the equipment by eliminating a number of sub-systems required in the current equipment such as dedicated feeders for each of the mail piece elements, it improves reliability by eliminating some of the more trouble prone steps such as feeding and inserting. It saves “back office” costs associated with separately ordering, shipping, warehousing, and handling multiple elements typically included in the mail pieces. (Only a single continuous web of printed material must be ordered prior to the job; and in some implementations, the web could be ordered blank and printed using a printer that is on-line to the mail creation process.) The proposed method and system generally simplifies the entire mail creation process. And it enables automatic creation of multiple types of mail pieces in the same job and eliminates the steps of handling different types of mail pieces in separate processes.

With regard to simplification of the equipment, an example of a subsystem that can be eliminated by the present invention is the addressing subsystem. In a conventional system, addresses are typically printed on the envelopes by a separate imaging system, such as a high speed ink jet printer. As described below, the present invention enables addressing by the same imaging system that prints the mailpiece contents. Thus the present invention allows simplification by eliminating a subsystem, and saves the associated costs of labor and supplies.

In a first embodiment, the present invention provides a method for producing a continuous web of printed material for use in creating mailpieces. The continuous web has a width and a length, the length comprised of a series of attached sheets. The series of attached sheets are comprising envelope sheets and content pages. The method for producing the web includes printing content pages onto the continuous web. The content pages are rectangular in shape, having a long dimension and a short dimension. The short dimension is parallel to left and right edges of the web. The method also includes printing envelope sheets. The envelope sheets are printed to have an envelope sheet width dimension parallel to the width of the web, the envelope sheet width dimension being the same as the content page long dimension.

In a preferred embodiment, the step of printing content pages includes printing written matter such that lines of writing are parallel to the left and right edges of the web. Similarly, the step of printing envelope sheets may include printing envelope matter such that lines of writing are perpendicular to the left and right edges of the web.

In this embodiment, the step of printing the content pages includes dimensioning the content page short dimension to be less than or equal to an envelope width formed from the envelope sheets. The envelope width is parallel with the web width and less than the web width.

In one embodiment, there is an additional step of printing BRE sheets in series with the content pages and envelope sheets. The BRE sheets are dimensioned to form BREs small enough to fit inside envelopes formed from the envelope sheets. In this embodiment, the step of printing envelope sheets includes printing BREs with individualized return addresses.

In a preferred embodiment, the method includes a step of printing a control code on one or more of the sheets for a given mailpiece. The control code includes information for controlling assembly of the mailpiece. The control code may have mailpiece information embedded directly in the code, or it may include a pointer to a mailpiece control file in the control code. The control code may be printed on a portion of the sheets that is intended to be discarded.

Two sets of sheets may be printed across the width of the web by printing content pages onto the continuous web such that two end-to-end content pages are printed across the width of the web. Also, two side-by-side envelope sheets are printed across the width of the web and in series with the end-to-end content pages.

In an additional embodiment, the step of printing envelope sheets may include printing postage indicia on the envelope sheets.

In an alternative web arrangement, the continuous web may be printed such that two side-by-side content pages are printed across the width of the web, the content pages printed to be rectangular and having a long dimension parallel to the length of the web and a short direction parallel to the width of the web. In this embodiment, a single envelope sheet positioned across the entire width of the web, in series with the side-by-side content pages.

In a further embodiment, the method includes determining a processing time in the mail creation machine for a content page group for the given mailpiece. The method also determines a processing time in the mail creation machine for the at least one envelope sheet for the given mailpiece. Based on these processing times, the steps of printing the content pages and printing the envelope sheets includes a further step of separating the content page group and the envelope sheet for the given mailpiece, along a direction of the length of the web, so as to reduce a delay between completion of the content page group and of the envelope sheet in the machine. The amount of separation is a function of the determined processing times of the content page group and the envelope sheet. The step of separating may include interspersing sheets belonging to different mailpieces between the content page group and the at least one envelope sheet for the given mailpiece.

Further details of the present invention are provided in the accompanying drawings, detailed description, and claims.

DETAILED DESCRIPTION

Figure 1:
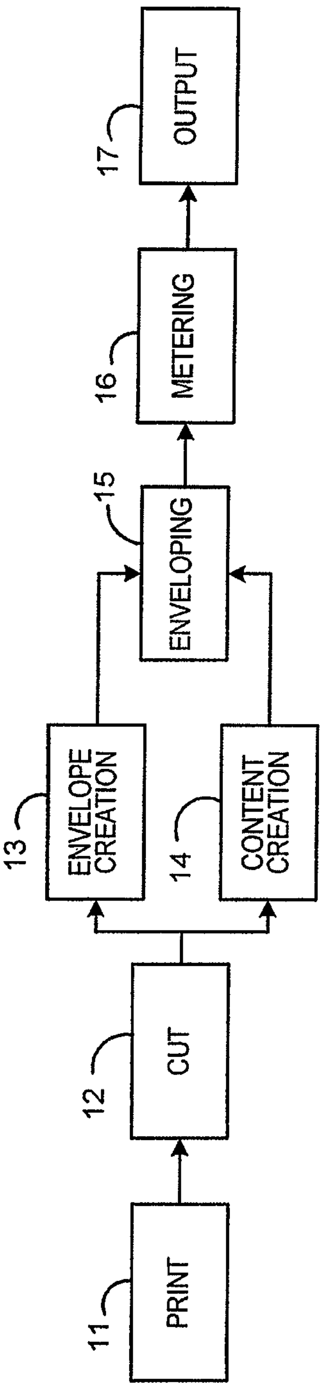
FIG. 1 is a flow diagram showing steps for in-line production of mailpieces from a single web.

The in-line envelope solution in accordance with the present invention is a method or system that creates a complete mailpiece from one continuous paper stream. For a given mailpiece, the paper stream contains variable numbers of pages, variable size documents (including inserts), an optional BRE, and the envelope. The machine cuts and folds the documents and envelopes, creates the envelope and BREs, and assembles the mailpiece in one self-contained system.

The present invention may be used advantageously with improved color Variable Data Printing (VDP), allowing graphical, color content to be printed in-line with text. With increased use of color VDP technology, sophisticated mail communications can be printed in a single step onto a continuous web of material. The present invention provides a method for handling that continuous web to more efficiently produce finished mailpieces.

Adopting color VDP printing techniques with the present invention will allow efficiencies by allowing mailers to: eliminate preprinted forms, eliminate preprinted inserts, mix application processing, and reduce operator error. A key benefit of color VDP applied with the present invention will be the capability to eliminate the preprinting of forms and inserts, reducing inventory and operational complexity. Larger, more densely presorted mailstreams can be created by combining different applications. Including both the forms and the inserts in the printstream will greatly reduce operator error potential for loading the inserter incorrectly.

By including the envelope in the printstream to be prepared in accordance with the present invention, the following advantages are realized: variable size envelopes inline—tri-fold and halffold, special envelopes for thicker mail, personalization of envelope and BRE, close-faced envelope and BRE, reduction in operator paper handling and lifting, reduction in operator errors, no manual job changeover, and reduction in inventory. The invention further simplifies inserting equipment (for example eliminating multiple feeders and address printers) for reduced cost and improved reliability.

Because the envelope is created dynamically with the document, there can be mixed envelope sizes included in the run. It is not uncommon that mailers have high volume applications with a large number of lower page count documents intermixed with a few high page count mailpieces. The lower page count documents work better as tri-fold, while the higher page count ones must be half-folded. In traditional solutions, this can only be accomplished in two separate runs.

Using the present invention, the envelope is made for the mailpiece, and can be of varying size. For example, a larger envelope with an extra fold can be used to create more volume within the envelope for a very thick mailpiece.

Another benefit of the present invention is personalization of a close-faced (without a window) BRE and envelope. While many BRE's are open window, there is a preference for closed envelopes because of enhanced reliability in automated processing, particularly in the United States Postal Service. The close-face mailing envelope is the preferred solution from both a processing and an aesthetic point of view.

The personalization of the BRE and envelopes also allow mixed applications to be processed with fewer restrictions than would be if the envelopes were preprinted as in the traditional process. The BRE can also be personalized with the recipients' own return address rather than the current practice of reliance on the sender to fill it in.

The operations benefits are also significant. Traditional high volume systems result in operators having to lift over a ton of material a day, often requiring two operators per machine. An alternative solution is to install robots to lift and place material. This can be very costly, as well as restrictive since the robots are fixed in place and trained for very specific activities. The operator of a machine using the present invention needs only to load a roll of paper and clear completed envelopes at the end of the process. The potential for operator error of using wrong BREs and envelopes is also eliminated. Also, compared to loading of materials into a conventional inserter, the number of operator required actions for the present invention are substantially reduced.

The present invention could eliminate all inventory except the rolls or stacks of paper for printing the mailpieces. It may also be useful for providing a complete disaster recovery option. Currently, envelopes and BREs must be stocked or at least quickly available to match the application in all disaster recovery locations. Often, the inserts are not used since they may not be available at all. With the present invention, the machine creates the whole mailpiece, the data file can be processed at any site from a roll of blank paper, and the exact mailpieces will be produced.

In the preferred embodiment, the present invention may be used for creating a variety of mail piece types including tri-fold sheets inserted into a No 10 envelope, half-fold sheets inserted into a 6"×9" envelope, and non-folded sheets inserted into a flats envelope, in which all (or most) of the elements of all of the various types of mail pieces are printed on a continuous roll of paper. The proposed system is capable of fabricating a variety of types of envelopes from portions of the printed material on the continuous web, cutting a variable number of sheets from the same web, assembling the sheets into sets, folding (or not folding) the sheets, then fabricating the appropriate type of envelope around the assembled set of sheets, the type of envelope being a function of the number of sheets in the mail piece content. Additionally, other elements of the mail pieces such as business reply envelopes can similarly be printed on the same web of paper and fabricated into the appropriate shape for inclusion in the mail piece in a single process.

Multiple types of mail pieces can be created automatically, continuously, and in random order, including tri-fold sheets inserted into a No. 10 envelope, half-fold sheets inserted into a 6"×9" envelope, and non-folded sheets inserted into a flats envelope, all from elements printed in serial order on a continuous web of paper. The proposed method and system fabricates a variety of types of envelopes from portions of the printed material on the continuous web, cuts a variable number of sheets from the same web and assembles them into sets, folds (or not folds) the sheets, then fabricates the appropriate type of envelope around the assembled set of sheets, the type of envelope being a function of the number of sheets in the mail piece content. Additionally, other elements of the mail pieces such as business reply envelopes can similarly be printed on the same roll of paper and fabricated into the appropriate shape for inclusion in the mail piece in a single process.

FIG. 1 depicts an exemplary process flow for creating mail from a single web of printed material. At a first step 11, the documents are printed on a continuous web of paper, preferably using color VDP technology, as described above. The web may be formed into a roll, or into a fan-folded stack, as is known in the art.

At a cutting step 12 the web is first provided to a cutting module. The cutting module may be comprised of a guillotine cutter, a laser cutter, a die cutter, a rotary cutter, or a combination of suitable cutting means. In the preferred embodiment, the cutter cuts variable length sheets depending on which element of the mailpiece is being cut. In addition to varying sizes, the sheets may be cut into varying shapes. Coded markings on the web are scanned by the system and indicate what cuts are to be made. For example, a statement sheet may be cut to a standard 8½×11 sheet. If the sheet is an advertisement or insert, it is typically cut smaller. Envelope sheets require that portions of the sheet be cut away in order to form flaps to be folded. Combinations of cutting mechanisms can be used. For example, a guillotine cutter can be used to make cuts across the transverse width of the web. A laser cutter can be used to cut unique features and shapes into the sheet.

Downstream of the cutting step 12, the process flow can vary depending on the type of sheet that has been cut from the continuous web. If the sheet is an envelope sheet it is directed to envelope creation processing 13. If the sheet is a content page, such as a statement, or advertisement, it is directed to a content processing 14. Content processing 14 may include further steps of accumulating sheets into a coherent set, and folding the set an appropriate number of times.

For envelope creation processing 13, further cutting is required to form the envelope flaps. In one embodiment, to cut away material to form the envelope flaps, a die cutter may be employed in the envelope creation processing 13 downstream of a guillotine cutter used in the cutter step 12. Different die cutters may be placed in series so that depending on the envelope size desired, the appropriate die cutter can be used. The number of different envelope sizes that can be created will be limited by the number of die cutters. To allow greater variation, a laser cutter may be used in envelope processing 13. In another embodiment, the laser cutter may be included in cutter step 12 to cut the required envelope shape.

Once the envelope flaps are formed, and excess material has been cut away and removed, the envelope processing step may include application of adhesive to the envelope flaps, in order to facilitate the eventual closing and sealing of the mailpiece. Adhesive may also be applied as part of the downstream enveloping step 15. For envelopes, the preferred adhesive will typically be a quick drying glue.

In the enveloping step 15, the envelopes and the content are combined so that the content is enclosed within an envelope. In one embodiment, the envelope sheet and flaps have been formed in upstream processing. The content materials are then positioned on the envelope sheet. Once the content is placed on the face of the envelope sheet, then the flaps are folded closed around the content. Glue that has been applied to the envelope flaps at the envelope creation step 13, or at the enveloping step 15, secures the flaps closed, to form a closed envelope around the content.

In step 16, a postage indicia may be placed on the closed envelope. Alternatively, the postage indicia may have been placed on the mailpiece at printing step 11. Finally, the finished mailpiece is sent to an output stage 17 for stacking, sorting, and preparation for postal pick-up and delivery.

Figure 2:
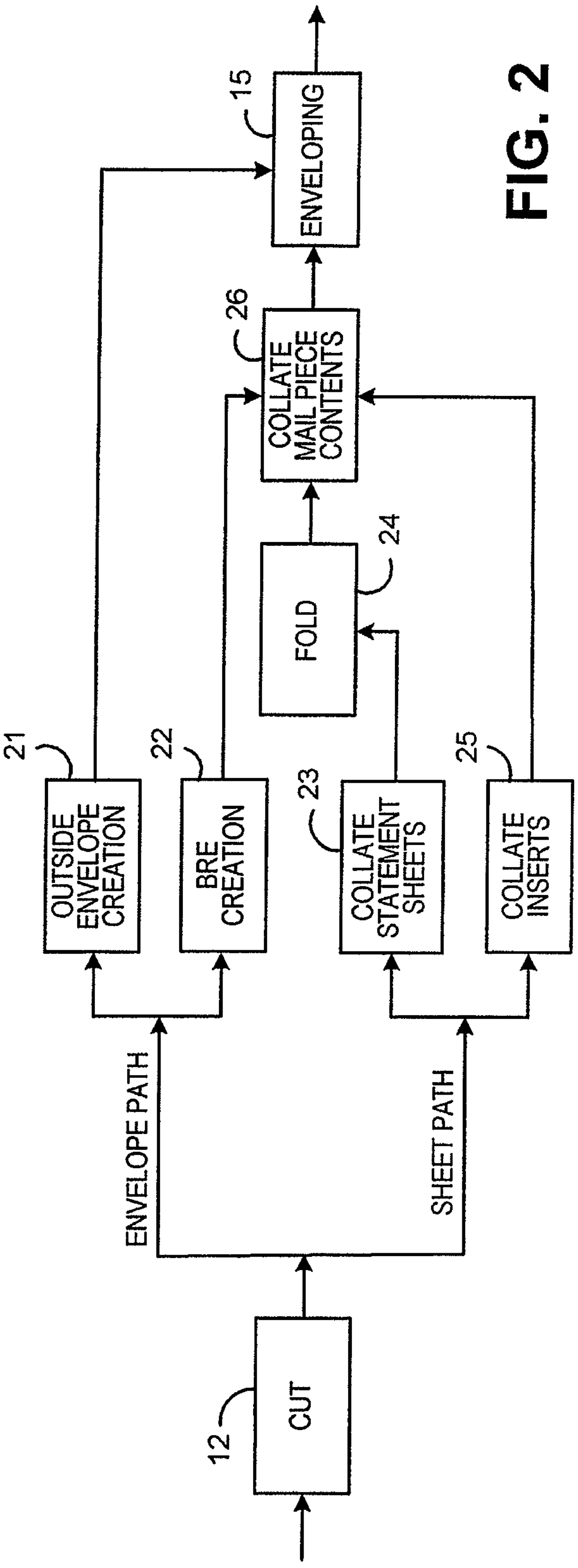
FIG. 2 is a more detailed preferred embodiment of steps for in-line production of mailpieces from a single web.

In FIG. 2, an exemplary embodiment shows expanded steps for the envelope and content creation steps 13 and 14. The content processing step 14 includes further sub-steps of collating statement sheets 23 and collating inserts 25. Collated statement sheets are typically folded (step 24), while insert sheets, being of a smaller size, are typically not folded.

In the envelope creation path of FIG. 2, the envelope creation step 13 is expanded to depict both outside envelope creation 21 and BRE creation 22. BRE creation 22 differs from the outside envelope creation in that the finished BRE envelope is not required to enclose any documents during processing. The BRE must be complete prior to enclosure in the outer envelope, and the BRE flap is not sealed. Accordingly, the BRE creation step 22 must include placing glue on the envelope flaps and folding to make a finished BRE. At step 26, the BRE, the folded collated statement sheets, and the collated inserts, are all combined to form a complete content packet. At enveloping step 15, the outside envelope sheet is folded and wrapped around the content packet.

For purposes of the present application, it should be understood that different branches in the flow diagrams of FIGS. 1 and 2 do not necessarily mean that envelope sheets and content sheets must always take separate physical paths. For example, the physical processing components can be in series, and an envelope sheet may simply pass through the content creation 14 components, before arriving at the envelope creation 13 components. Similarly, content sheets may simply pass through envelope processing 14 equipment without being acted upon.

A system controlling assembly of mailpieces from a single web must be able to handle a number of variables for each mailpiece. Variables include: variable number of pages, variable page dimensions, optional folded pages, sub-accumulations within the mailpiece, both pre and post folding, variable size BRE creation, and variable sized outside envelope creation. Control is preferably achieved by scanning codes printed on the web for instructions to be provided to the system. The codes may include mailpiece information and instructions embedded directly in the code. In the preferred embodiment, the codes include a pointer to a mailpiece instruction file stored in a control computer.

The information derived from the codes should contain all of the attributes for each individual mailpiece in the form of parameter values. Preferably, all of the parameters can be determined from a one or multi-dimensional barcode printed on components of the web. The parameters for mailpiece creation, as used by the system, may include: all necessary envelope dimensions for outside envelope and BRE, glue placement locations, sheet dimensions for every sheet (not necessarily rectangular), fold type, all necessary insert dimensions, sheets per mailpiece, enclosures per mailpiece, pre-folder accumulation instructions, post folder accumulation instructions, and location and orientation of each individual mailpiece component within the web comprising a finished mailpiece.

Figures 3A, 3B, 3C:
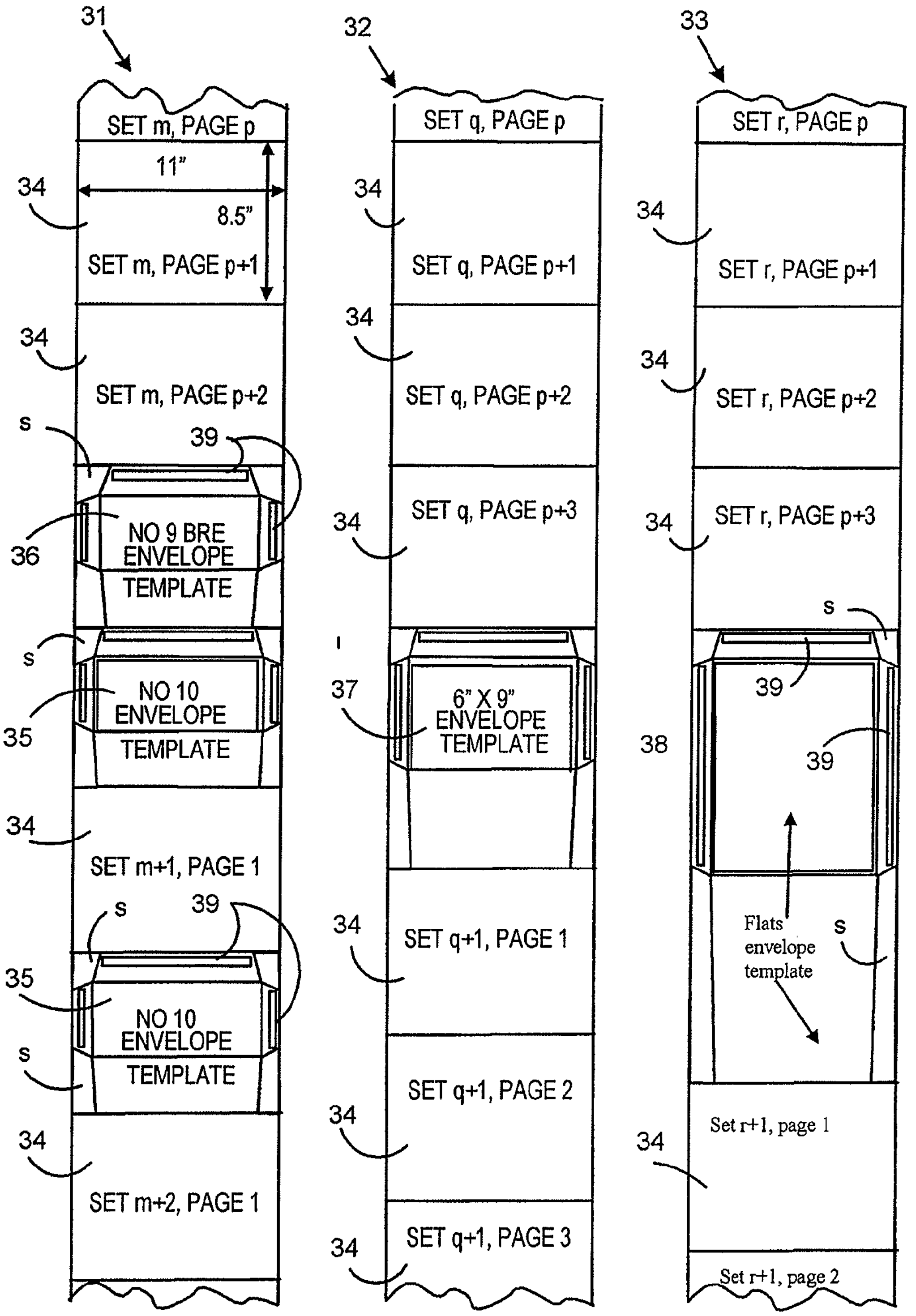
FIGS. 3*a*-3*c* depict exemplary embodiments of web arrangements for use with the present invention.

FIGS. 3A, 3B, and 3C in the attached material shows segments of a typical continuous web of printed material which will either be pre-printed, or printed on-line as part of the mail creation system. Components of different mail types are shown intermixed on the web of paper. Beginning at the top of FIG. 3A, sheets 34 from set m, including three pages (p, p+1 and p+2) are shown printed on a continuous web 31 in abutting relationship to one another. These three pages are the cut sheet components representing the content of a single mail piece m. Next is shown a template 36 for a BRE envelope to be included in the same mail piece. Information such as the return address and method of postage payment are printed on this BRE template 36. Next is the template 35 for a No 10 envelope, on which recipient address, return address, method of postage payment, and other information might be printed. Information can be printed on portions of one face this template that will become both the front and back of the envelope once the envelope is assembled around the mail piece contents.

On envelope templates 35 and 36, areas S represent scrap portions that will be cut away in order to form the closing flaps of the envelope. It should be understood that the term "envelope templates" or "envelope sheets" refers to entire sheet, including scrap portions S, or the like, that may be cut away from the periphery. Glue locations 39 depict the preferred locations for placing glue to hold the finished envelope together. In the depicted embodiment, sheets 34 are standard letter sized, for example 8.5" by 11" in the U.S. Any arrangement of text and graphics can be printed on the sheets 34, although in one exemplary embodiment sheets 34 will represent pages of a statement with a top and bottom of the statement page being at the left and right sides of the web 31. The width of the statement sheets 34 will be 8.5" along a direction of the length of the web, while the height of the statement sheets will be 11", the width of the web. In this exemplary embodiment, statement text is written in lines perpendicular to the width of the web, so that the finished 8.5" by 11" page will be read in a "portrait" orientation. Alternatively, it will be understood that the text can be written in lines parallel to the width of the web so that the finished page will be read in "landscape" orientation.

The next element, abutting the No 10 envelope template 35 is a single sheet 34 for the next mail piece—designated set m+1, page 1. In this example, mail piece m+1 contains only a single sheet 34 of information to be included in the No 10 envelope template 35 abutting this sheet on the bottom edge. The first component of a third mail piece, designated set m+2 abuts the No 10 envelope template 35 on the bottom edge.

The example continues in FIG. 3B, which shows another segment 32 of the continuous web shown in FIG. 3A. First, beginning at the top of the FIG. 3B, cut sheet elements 34 of set q are shown, including pages p, p+1, p+2, and p+3 in abutting relationship. In this example, these sheets 34 are a portion of a larger set having between six and twelve sheets. Abutting page p+3 is the template 37 for a 6×9" envelope which will later be wrapped around the assembled sheets from set q. Below the template 37 for the 6"×9" envelope are the first sheets 34 from the next set.

In FIG. 3C, in another portion of the same continuous web, set r is shown on the top of the web 33, including pages p to p+3. These sheets 34 are a portion of a set which includes more than twelve sheets. These will be cut into individual sheets 34 and assembled into a larger set to be part of a third type of mail piece. Below page p+3 is a template 38 for a flat envelope, which will later be cut from the web and assembled around the set r of assembled sheets.

FIGS. 3A, 3B and 3C show portions of a continuous web (31, 32, and 33) with multiple quantities of at least three types of mail piece elements (sheet pages 34, BREs 36, and outside envelopes 35, 37, and 38) printed in abutting relationship with one another. These elements are to be assembled into at least three types of mail pieces: tri-folded contents for inclusion in No 10 envelopes for mail pieces with, for example, fewer than five sheets; half folded contents for inclusion in 6"×9" envelopes for mail pieces with between six and twelve sheets; and un-folded sheets for inclusion in flats envelopes for mail pieces with more than twelve sheets. In a preferred embodiment the webs 31, 32, and 33 may all be part of a single continuous web. Other mailpiece elements such as inserts may be similarly printed in the appropriate places in the continuous web.

It will be appreciated that the examples in this application use US standard sizes, but that the invention is not limited to any set of standard dimensions. The methods and systems described in this description also apply to mailpieces of any dimensions, including standard sizes for Europe, or other regions. Such standard sizes are well known in the art, and do not need to be listed in this application.

The relative positions of the pages and envelopes for a given mailpiece, as shown in FIGS. 3A-3C, is exemplary only. In a preferred embodiment the placement of envelopes sheets relative to content sheets for a given mailpiece will be optimized to maximize throughput of the system. For example, the envelope processing may include time consuming glue application steps. As such, the envelope processing may be the slowest step in the creation of the particular mail piece. Accordingly, the envelope sheet for the mailpiece can be placed farther in advance than the content sheets in the web, so that all of the mailpiece components can be ready for assembly at the same time.

Conversely, for a different mailpiece, accumulating and folding of content sheets may be the slower process, and thus the content sheets could be placed in advance of the corresponding envelope sheet. Component sheets of different mailpieces may be interspersed with one another in order to gain the best optimization of processing time for the entire web.

The optimization of placement of mailpiece components on the web is carried out as part of the web printing process. The processing times for various stages in the system will be known. Accordingly, optimized placement of pages on the web can be accomplished by determining the relative processing times needed to create the various components in the system. Then, in the printing process the components can be separated, along a direction of the length of the web, so as to reduce a delay between completion of the various components, as a function of the determined processing times. This process will preferably allow sheets belonging to different mailpieces to be interspersed with one-another. For example, content materials for one mailpiece may be printed between the content pages and the envelope sheet for another mailpiece. By reading codes on the mailpiece components, the system is able to track the positions of the various mailpiece components placed apart on the web, and ensuring that the components are properly assembled.

Figure 4A:
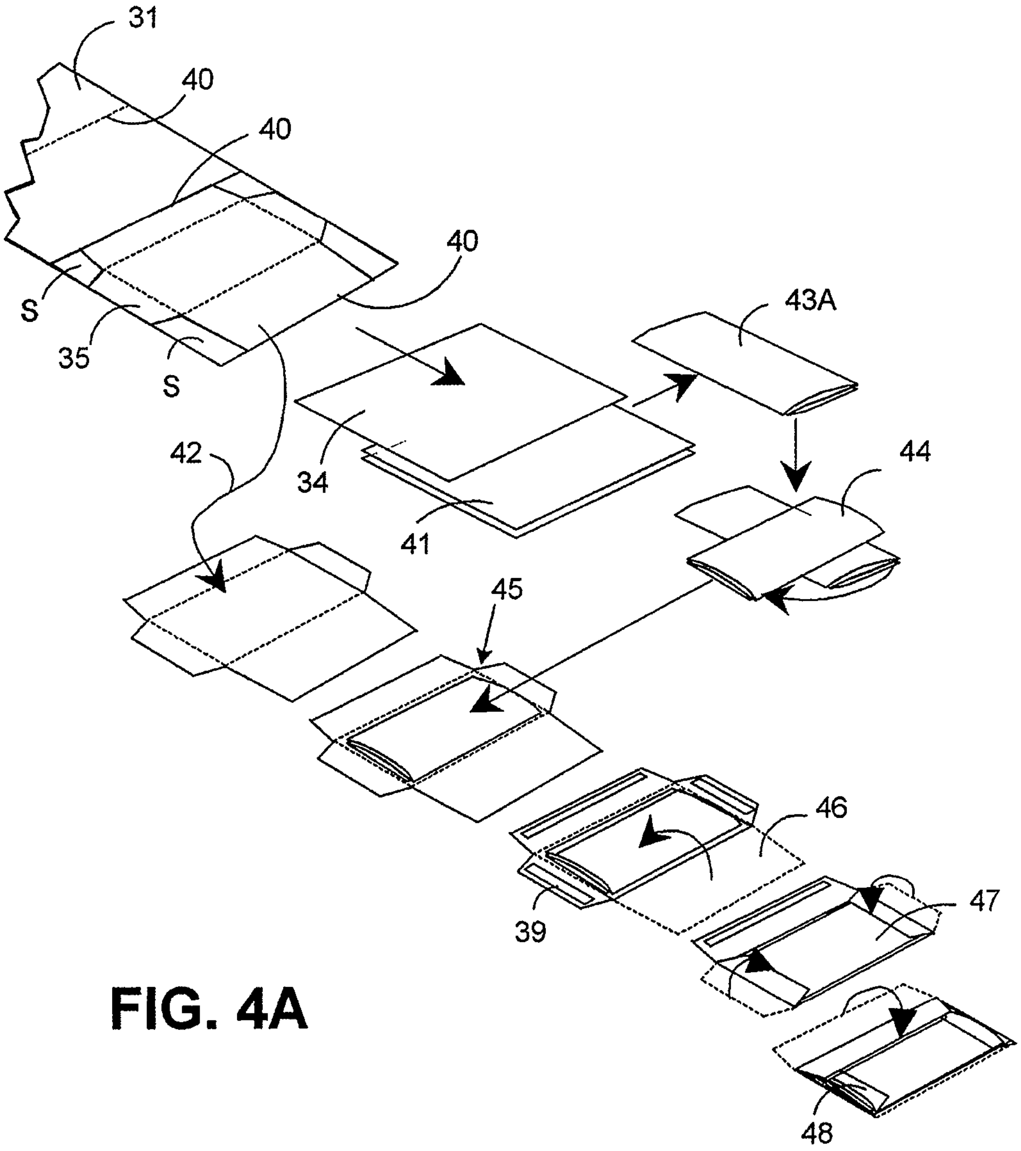
FIGS. 4*a*-4*c* depict exemplary embodiments of steps for assembling mailpieces from the single web.

FIG. 4A shows exemplary steps in the process of creating a mail piece from the elements printed on a continuous web when the mail piece to be created has fewer than five sheets and will become a No 10 size mail piece. First, the envelope template 35 is cut from the web 31. Scrap portions S of the web will be trimmed from around the template and removed. This un-folded template 35 is then advanced (step 42) in the web direction to an enveloping area for later processing. Next, up to five sheets 34 for this particular mail piece are cut from the web 31 accumulated into a set 41. This set 41 is then sent through a folder sub-system, and folded in either a C-fold, Z fold, or double-fold packet. As seen in FIG. 4A, to properly fold the sheet set 41 across its page width, the set 41 must be moved in a direction orthogonal to the direction of the web. The packet 43A is then rotated 90 degrees in step 44, and the rotated packet 43A is placed on top of the envelope template 35 in step 45. (Depending on the geometry, the envelope template may be inverted in order to have the printed face in the correct orientation.) At step 45 fabricated BREs or pre-manufactured BREs, or other elements such as other printed materials may be added to the packet 43 on the envelope template 35 at this point.

Finally, the envelope 35 is assembled around the packet 43A in steps 46, 47, and 48 wherein the various panels of the envelope are folded around the packet to create a sealed mail piece. In this embodiment, glue is placed on glue regions 39 to sealing the closed envelope. These last steps of folding the portions of the envelope template around the mail pieces are common in the following examples, and are not shown in the FIGS. 4B and 4C.

Figure 4B:
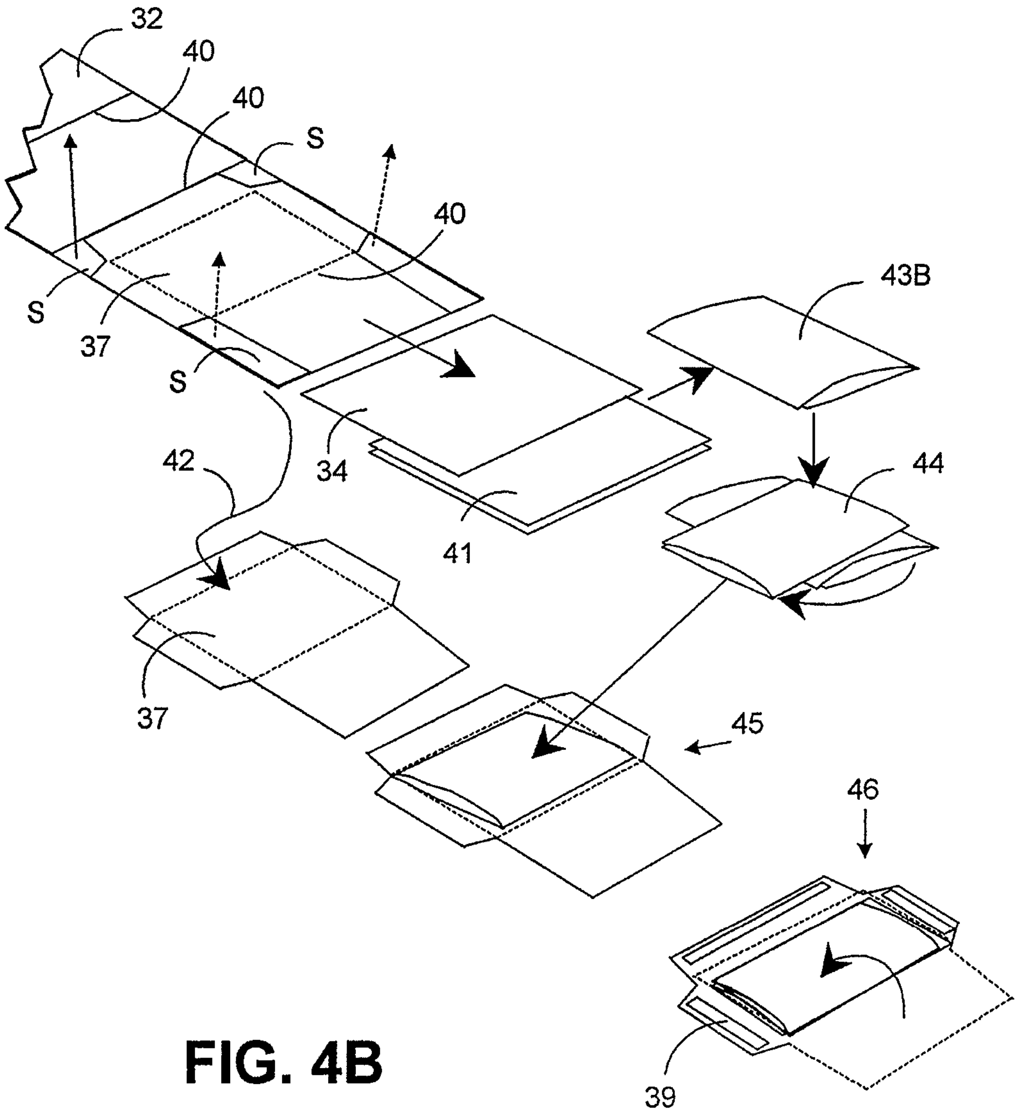

FIG. 4B illustrates an embodiment using the same steps as FIG. 4A when the mail piece contains between six and twelve sheets. The steps are the same except that the accumulated set 41 is only folded in half to form a half-folded packet 43B. At step 45 the half-folded packet 43B is joined with the envelope sheet 37.

Figure 4C:
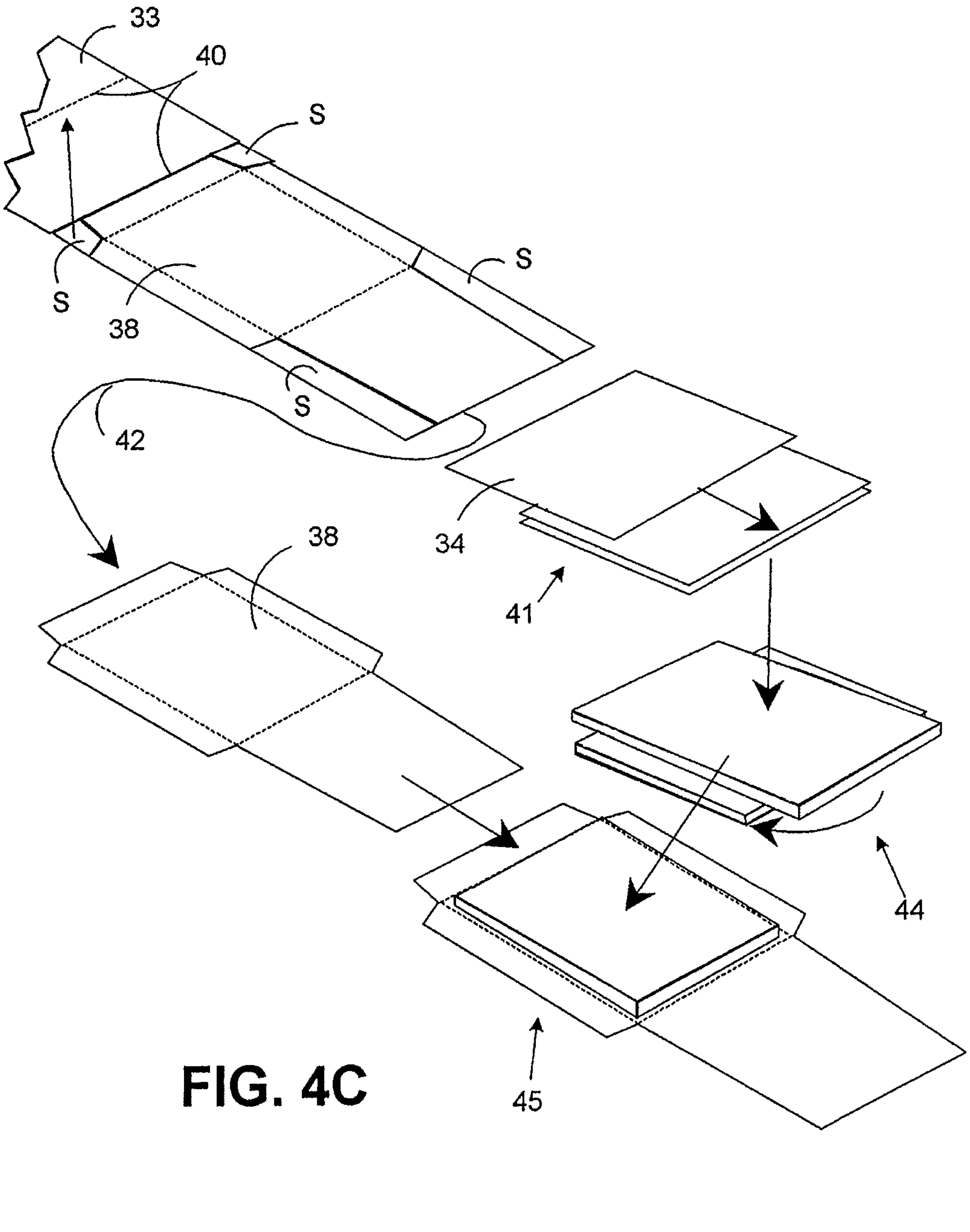

FIG. 4C shows the same steps as FIGS. 4A and 4B for a flats mail piece, except that the step of folding is eliminated. In this example, accumulated set 41 is rotated 90 degrees at step 44 and then placed, at step 45, on the unfolded flats envelope template 38. It will be appreciated that a step of fabricating a BRE envelope for inclusion in these types of mail pieces, as discussed in connection with FIGS. 1 and 2 may be included with the assembly process depicted in FIGS. 4A-4C.

Figure 5:
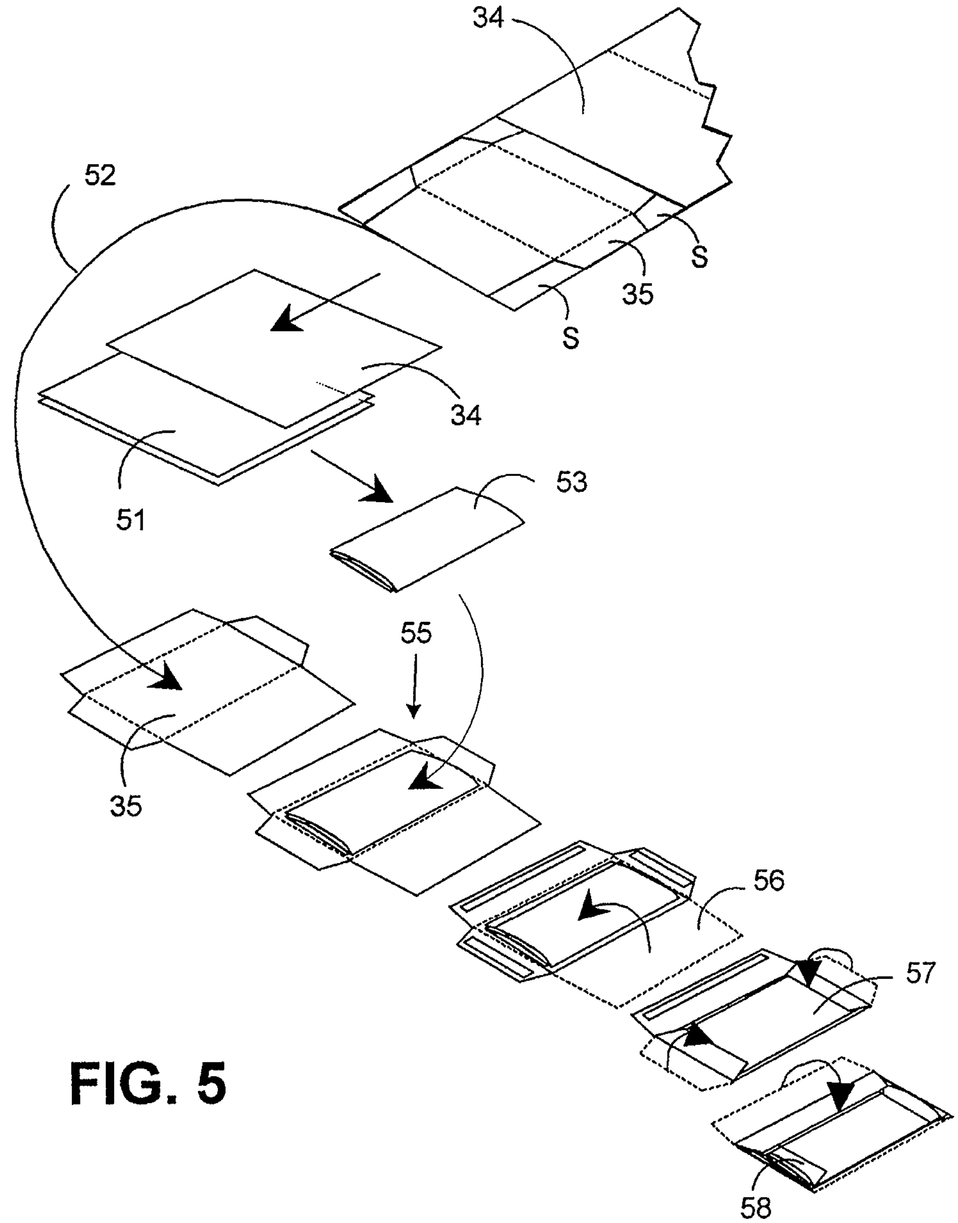
FIG. 5 depicts an alternative embodiment of steps for assembling mailpieces from the single web.

FIG. 5 depicts an alternative embodiment for handling of components to form mailpieces. In this embodiment, the step 44 of turning the packet 41 by 90 degrees has been eliminated. In this embodiment, at step 52, the envelope template 35 undergoes a 90 degree right angle turn prior to advancing to the enveloping area for later processing. Such right angle turns are known in the art, for example as depicted in U.S. Pat. No. 5,538,240, Right Angle Turn Over Module, which is hereby incorporated by reference. Using the right angle turn, not only is the envelope sheet reoriented positionally, but it is also traveling in a direction orthogonal to the original web direction.

The cut sheets 34 are accumulated into a set 51, while traveling in the original web direction. The set 51 is then folded into packet 53. This folding step changes the travel direction of the packet 53 so that it is now traveling orthogonally to the original web direction and in the same direction as the right angle turned envelope sheet 35. Then at step 55 the folded packet 53 is joined with the envelope template 35. In further steps 56, 57, and 58, the envelope flaps are folded shut around the packet to form a mailpiece.

In the examples discussed so far, the web has been configured with one sheet across its width. In the following description, additional embodiments and processing steps are depicted for webs wherein more than one sheet may be positioned across the width of the web. In conventional inserter equipment, it is known to process “2-up” webs having mailpiece pages positioned side-by-side. The side-by-side pages are split and cut into individual sheets for further processing.

Figure 6:
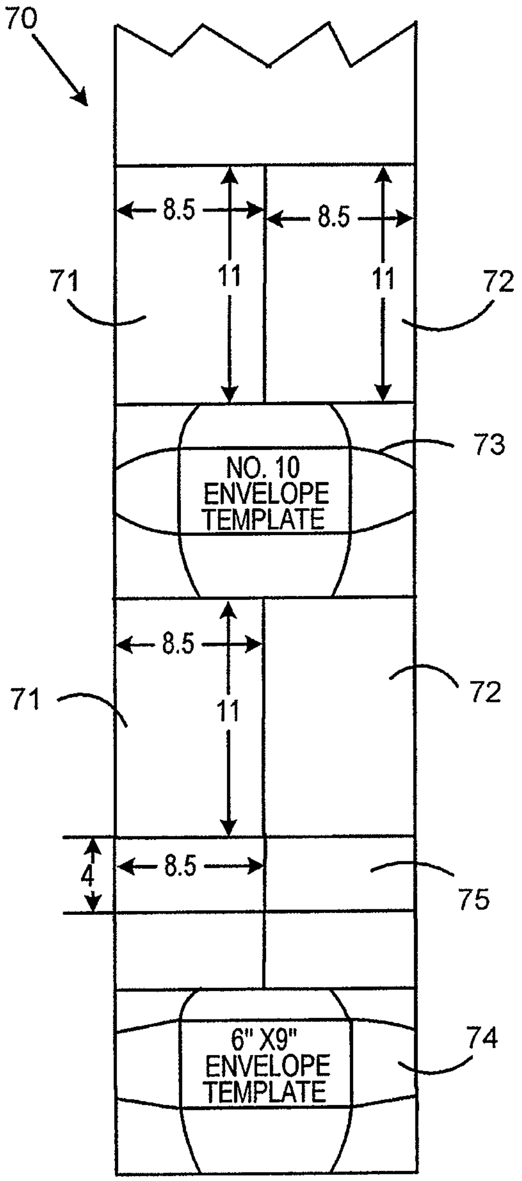
FIG. 6 depicts an alternative embodiment of a web arrangement.

In FIG. 6, an exemplary web 70 is shown. On the web side-by-side sheets 71 and 72 are positioned in series with a No. 10 envelope template 73. Provided that sheets 71, 72 are 8.5"×11", the width across the web 70 would be 17". With the envelope template 73 positioned across the entire width of the web, more flexibility is provided for different flap arrangements.

Also, in this web portion 70 side-by-side insert sheets 75, and a 6"×9" envelope template 74 are in series with the other components. It can be seen that envelope templates 73 and 74 span across the entire width of the web 70, while each sheet 71, 72 and insert 75 only spans half of the web width. As a result of this arrangement, the mechanism for splitting the side-by-side sheets 71 and 72 cannot continuously cut. The splitting mechanism must be retracted or stopped in order to allow the envelope templates 73 and 74 to pass without being split. Such a splitting mechanism may be comprised of a blade that extends and retracts in accordance with the position of the web below. Alternatively, the cutting mechanism may be a laser cutter that is turned on or off depending on whether the sheet needs to be split.

Figure 7A:
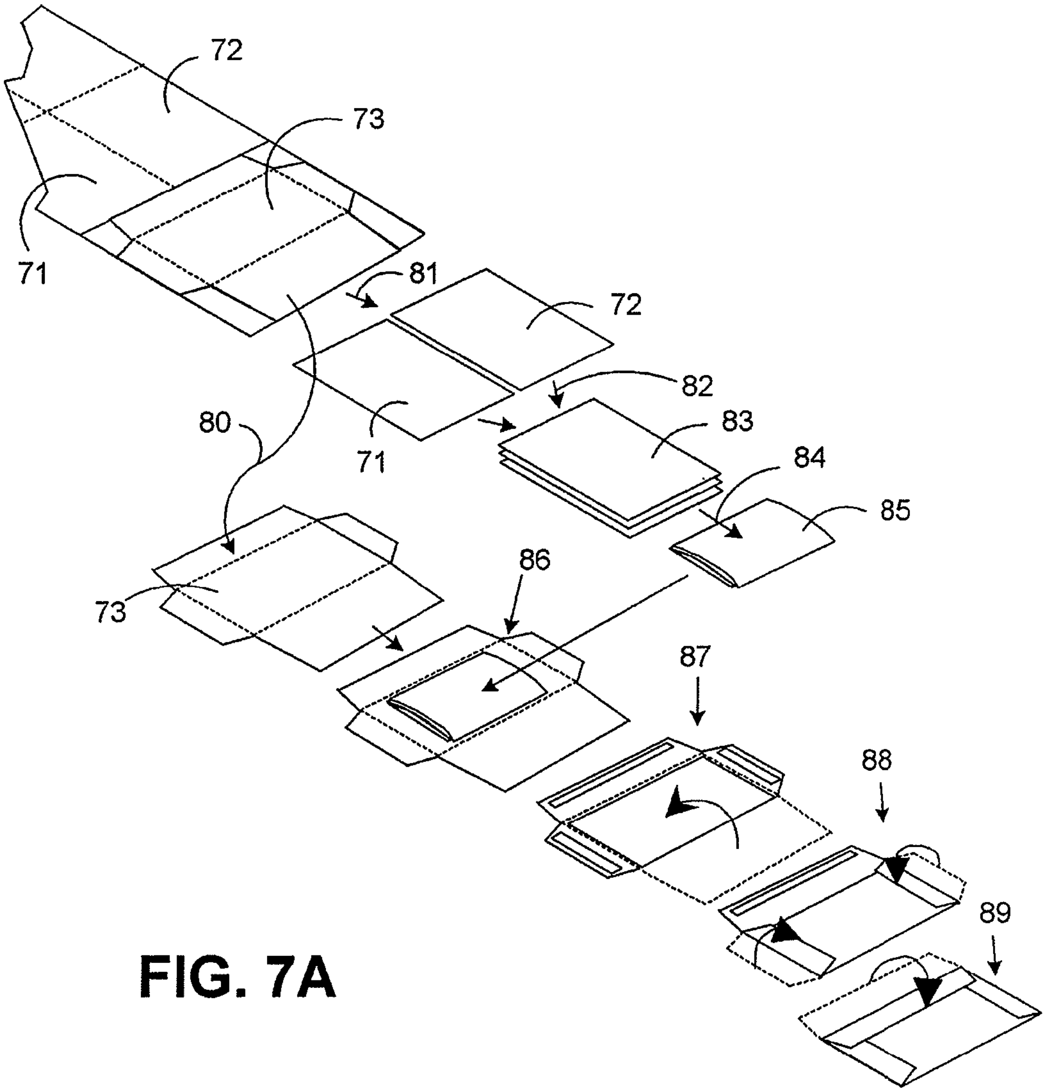
FIGS. 7A and 7B depict exemplary steps for assembling mailpieces from the web depicted in FIG. 6.
Figure 7B:
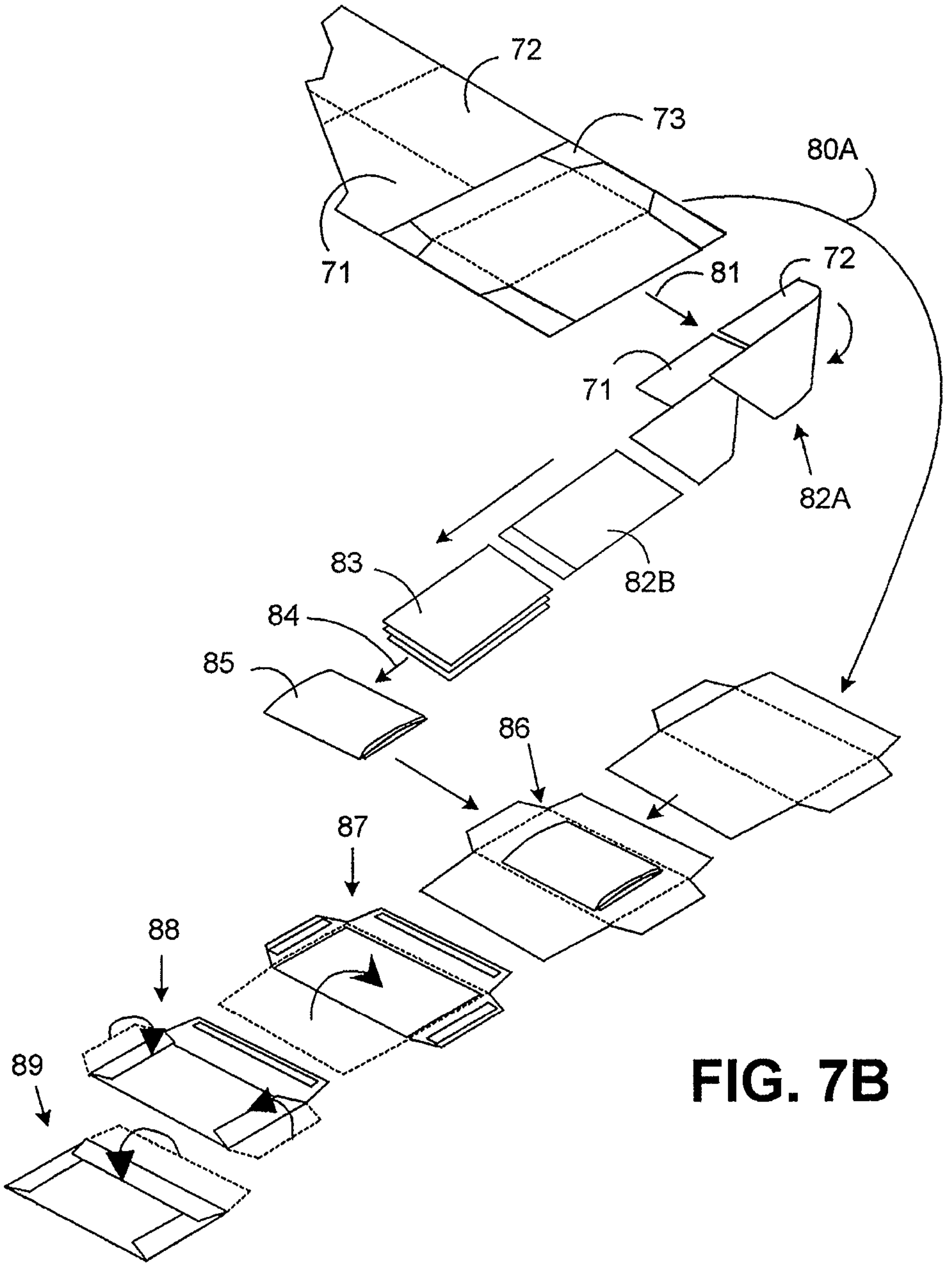

Steps for processing the web 70 of FIG. 6 are depicted in FIGS. 7A and 7B. As seen in FIG. 7A, the envelope template 73 is removed from the web and transported at step 80 to an enveloping area for later processing. At step 81, the left and right sheets 71 and 72 are separated from the web and transported in the web directions. At step 82, the sheets 71 and 72 are accumulated into a set 83. At step 84, the accumulated set 83 is folded along its width in order to form a folded packet 85. At step 86, the folded packet 85 is merged with the envelope template 73. In steps 87, 88, and 89 the envelope template 73 flaps are folded closed and sealed around the packet 85 to form a complete mailpiece.

FIG. 7B depicts essentially the same process as FIG. 7A except that the step 80A of transporting the envelope template 73 has been modified to include a right angle turn, whereby the orientation of the template 73 has been turned 90 degrees, as well as changing the travel direction of the template 73 by 90 degrees. Also, the step 82 of accumulating the sheets 71, 72 has been expanded to depict step 82A, whereby the sheets are subjected to a right angle turn, and in step 82B are repositioned in a linear overlapped arrangement. In the manner known on conventional inserter machines the overlapped sheets 71, 72 are accumulated to form the set 83. At step 84, the set 83 is folded, and at step 86 the folded packet 85 is merged with envelope template 73.

Figure 8A:
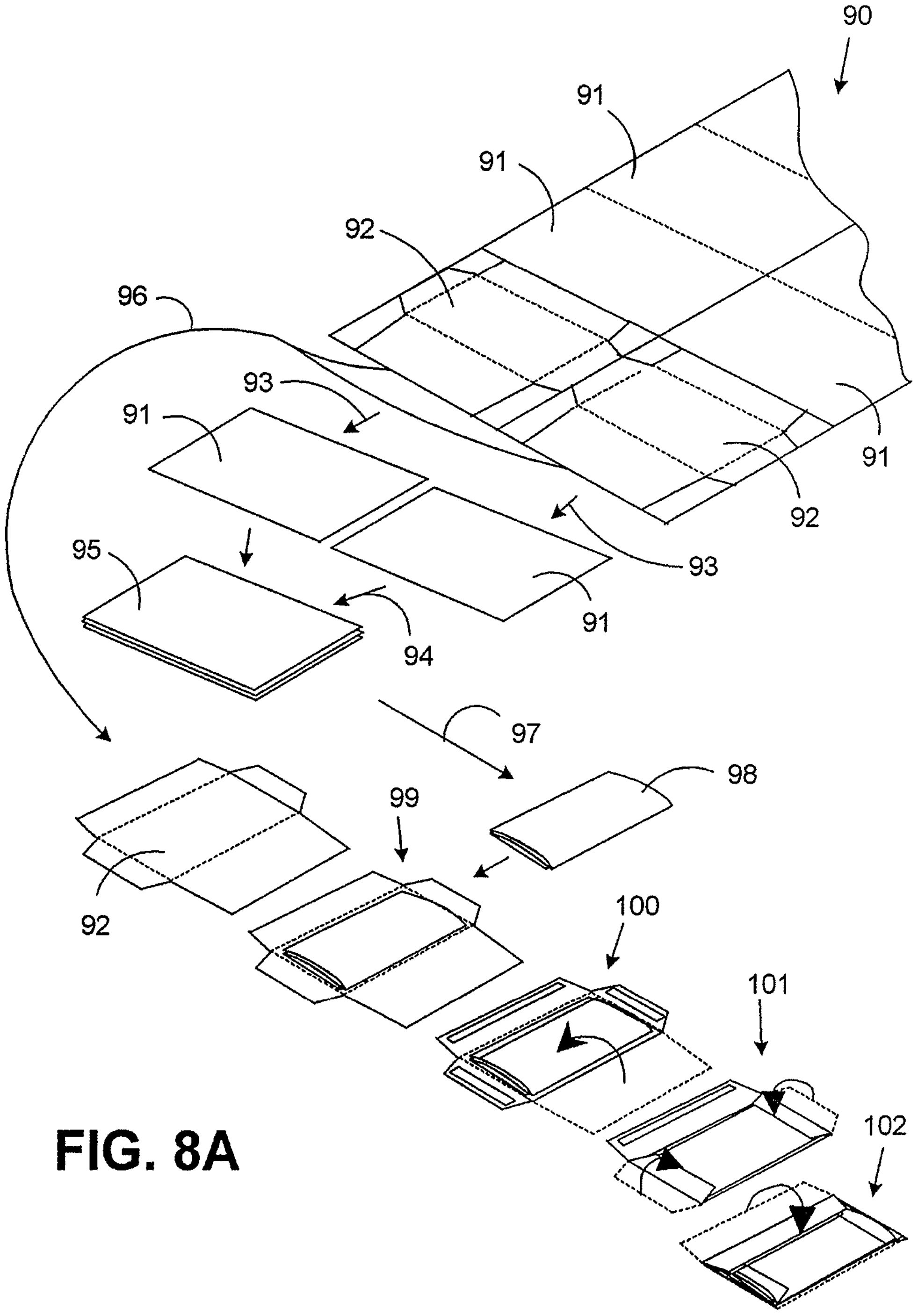
FIGS. 8A and 8B depict exemplary steps for assembling a 2-up variation of the web depicted in FIGS. 3*a*-3*c*.
Figure 8B:
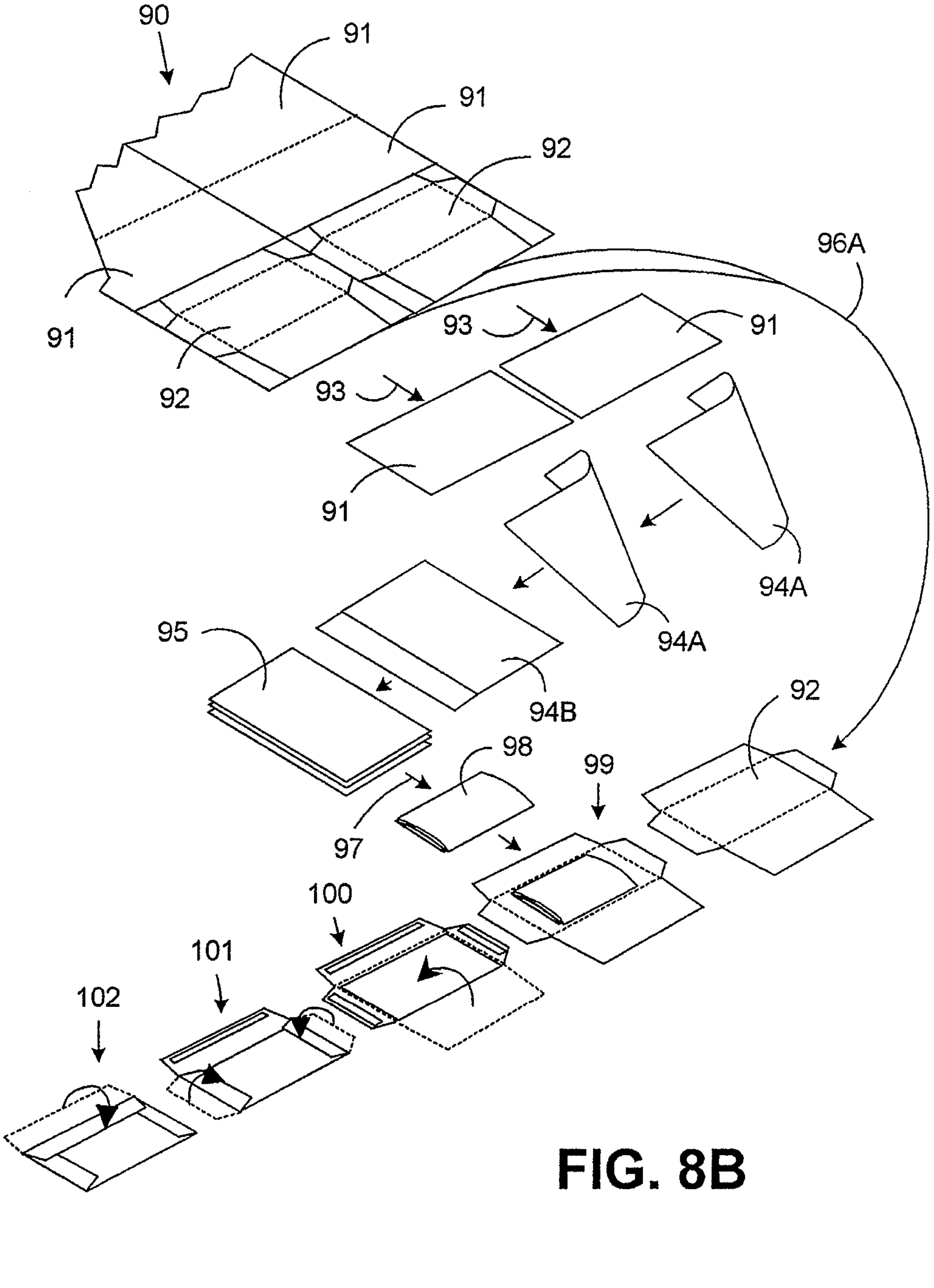

FIGS. 8A and 8B depict processing steps for yet another variation of the 2-up continuous web. Web 90 is comprised of end-to-end content sheets 91 positioned across the width of the web. Thus if the individual sheets 91 were 8.5"×11", the web 90 width would be 22", with the longer dimensions of the sheets positioned across the web 90 width.

As seen in FIG. 8A, the envelope templates 92 are removed from the web and transported at step 96 through a right angle turn to an enveloping area for later processing. At step 93, the sheets 91 are separated from the web and transported in the web direction. At step 94, the sheets 91 are accumulated into a set 95. At step 97, the set 95 is folded along its width in order to form a folded packet 98. In performing the folding step 97, the set 95 is moved in a direction orthogonal from the web direction, and parallel to the direction of template 92 transported in step 96. At step 99, the folded packet 98 is merged with the envelope template 92. In steps 100, 101, and 102 the envelope template 92 flaps are folded closed and sealed around the packet 98 to form a complete mailpiece.

FIG. 8B depicts essentially the same process as FIG. 8A, except that the step 94 of accumulating the sheets 91 has been expanded to depict step 94A, whereby the sheets are subjected to a right angle turn, and in step 94B the sheets are repositioned in a linear overlapped arrangement. In the manner known on conventional inserter machines, the overlapped sheets 91 are accumulated to form the set 95. The set 95 is then folded into packet 98, and merged with the envelope template 92 at step 99.

Figure 9:
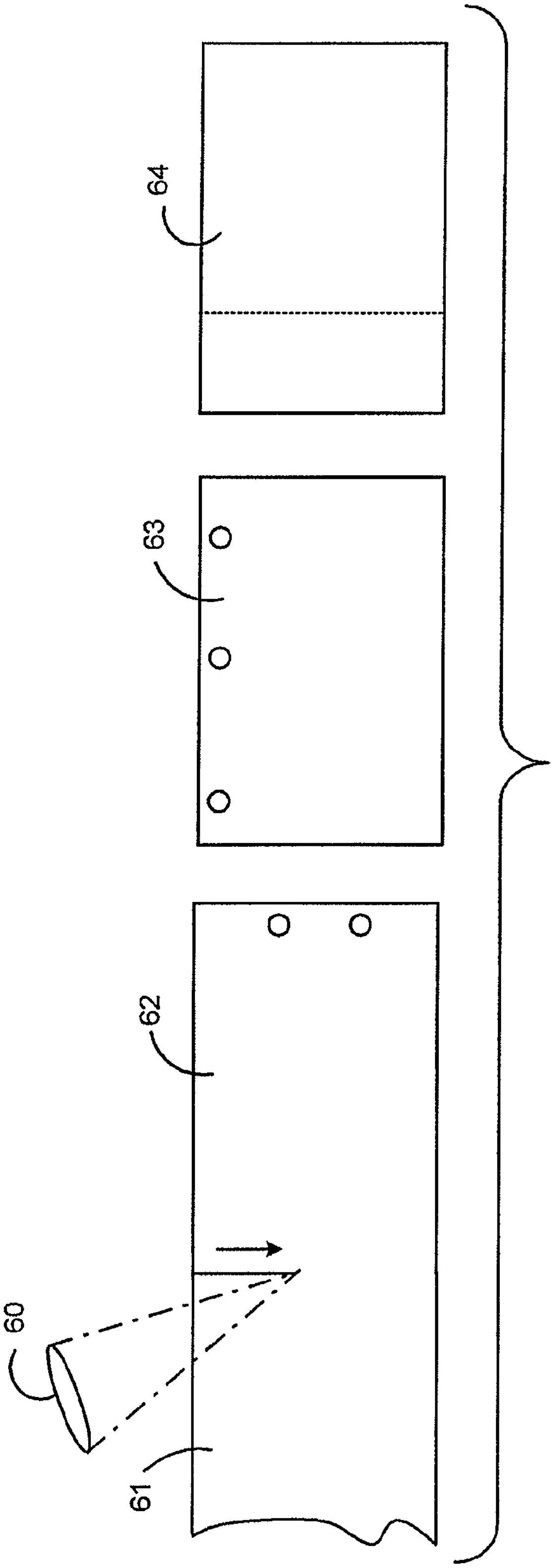
FIG. 9 depicts a preferred embodiment for on-demand cutting of sheets from the web using laser cutting.

FIG. 9 depicts an embodiment of the invention using laser cutting to create varying mail content from the web 61. In this figure, laser 60 is being used to cut a variety of exemplary sheets. For sheets 62 and 63, binder holes have been created in various locations. Thus, a customer who uses a three ring binder could request and receive pre-punched documents 63, while another customer might want no holes, or a two-ring arrangement of sheet 62. For sheet 64, laser 60 has been used to cut a perforation. Techniques for laser cutting paper are known in the art. For example, techniques applicable to the present invention are described in U.S. Pat. No. 6,191,382, which is hereby incorporated by reference. Using this laser cutting technology, the web 61 can run continuously, while laser 60 is moved to make the varying cuts as the web 61 passes below.

The laser cutter is preferably controlled in accordance with the control codes scanned from the web. Thus, variable holes, cuts and perforations can be provided on an individualized basis in different mailpieces created from the same web. The control codes, or the mailpiece file linked to the control code, will include all instructions for controlling the laser cutter.

As an alternative to the laser cutting embodiment, it will also be understood that variably cut sheets can be made using other technologies. For example, die-cutting technology may be selectively applied to cut and remove scrap material, to achieve similar results to those depicted in FIG. 9. However, die cutting variations will be limited to a preset number of die variations that are included in the equipment. In contrast, laser cutting can be used to for a greater variety of cuts.

In one embodiment, the control codes can be printed on scrap portions of the sheets that are intended to be cut away and discarded. For example, the scrap portions S used to form the envelope templates 35, 36, 37, and 38, as depicted in FIGS. 3A-3C. Alternatively, disposable strips along the edges of the web may include the control codes. By eliminating control codes on the documents themselves, a cleaner, more aesthetically pleasing, mailpiece can be presented to the intended recipient.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for producing a continuous web of printed material for use in creating mailpieces, the continuous web having a width and a length, the length comprised of a series of attached sheets, the series of attached sheets comprising envelope sheets and content pages, the method comprising:

printing content pages onto the continuous web such that the content pages are rectangular in shape, having a long dimension and a short dimension, the short dimension being parallel to left and right edges of the web; and printing envelope sheets, the envelope sheets having an envelope sheet width dimension parallel to the width of the web, the envelope sheet width dimension being the same as the content page long dimension wherein the step of printing content pages includes printing written matter such that lines of writing are parallel to the left and right edges of the web;

wherein the step of printing envelope sheets includes printing envelope matter such that lines of writing are perpendicular to the left and right edges of the web;

wherein the step of printing the content pages includes dimensioning the content page short dimension to be less than or equal to an envelope width formed from the envelope sheets, the envelope width parallel with the web width and less than the web width.

2. The method of claim 1 wherein the step of printing the content pages include dimensioning the content page to be a standard letter size.

3. The method of claim 2 wherein the step of printing the envelope sheet includes dimensioning the envelope sheet to form a standard envelope size, with the width dimension of the envelope sized to receive the short dimension of the content sheets, and a height dimension of the envelope sized to receive one third of the long dimension of the content sheets.

4. The method of claim 3 further including a step of printing BRE sheets in series with the content pages and envelope sheets, the BRE sheets being dimensioned to form BREs small enough to fit inside envelopes formed from the envelope sheets.

5. The method of claim 2 wherein the step of printing the envelope sheet includes dimensioning the envelope sheet to form a standard envelope size, with the width dimension of the envelope sized to receive the short dimension of the content sheets, and a height dimension of the envelope sized to receive one half of the long dimension of the content sheets.

6. A method for producing a continuous web of printed material for use in creating mailpieces, the continuous web having a width and a length, the length comprised of a series of attached sheets, the series of attached sheets comprising envelope sheets and content pages, the method comprising:

printing content pages onto the continuous web such that the content pages are rectangular in shape, having a long dimension and a short dimension, the short dimension being parallel to left and right edges of the web; and printing envelope sheets, the envelope sheets having an envelope sheet width dimension parallel to the width of the web, the envelope sheet width dimension being the same as the content page long dimension wherein the step of printing content pages includes printing written matter such that lines of writing are parallel to the left and right edges of the web, and further including the step of:

dimensioning the content page width to be less than or equal to an envelope sheet width formed from the envelope sheets, the envelope sheet width parallel with the web width and less than the web width, and wherein the step of printing the envelope sheet includes dimensioning the envelope sheet to form a flats envelope, dimensioned for enclosing unfolded content pages.

7. The method of claim 1 further including a step of printing a control code on one or more of the sheets for a given mailpiece, the control code including information for controlling assembly of the mailpiece.

8. The method of claim 7 wherein the step of printing the control code includes embedding mailpiece information in the control code.

9. The method of claim 7 wherein the step of printing the control code includes embedding a pointer to a mailpiece control file in the control code.

10. The method of claim 7 wherein the step of printing a control code includes printing the control codes on a portion of the sheets that is intended to be discarded.

11. The method of claim 1 wherein the step of printing envelope sheets includes printing BREs with individualized return addresses.

12. The method of claim 1 wherein the step of printing envelope sheets includes printing postage indicia on the envelope sheets.

* * * * *